United States Patent [11] 3,539,208

[72] Inventors George E. Gonsalves
Brooklyn, N.Y., and
Felice Dosso, Staten Island, N.Y. (both of
623 Bergen St. Brooklyn, N.Y. 11238)
[21] Appl. No. 817,735
[22] Filed April 21, 1969
[45] Patented Nov. 10, 1970

[54] LOCKING MEANS FOR BALL AND SOCKET JOINT
4 Claims, 5 Drawing Figs.
[52] U.S. Cl. .................................................. 287/12, 248/181
[51] Int. Cl. .................................................. F16c 11/06
[50] Field of Search .................................. 287/12, 21, 89, 87; 248/181, 481

[56] References Cited
UNITED STATES PATENTS
658,911 10/1900 Hall .............................. 248/181
2,328,135 8/1943 Gack ............................ 287/87
2,352,699 7/1944 Ennis ........................... 287/12

Primary Examiner—David J. Williamowsky
Assistant Examiner—Andrew V. Kundrat
Attorney—Philip G. Hilbert ABSTRACT: A ball and socket joint having means for locking the ball portion of the joint in any selected position thereof, the locking means being of the cam type to provide quick action grip and release means to facilitate rapid adjusted movements of the ball portion of the joint.

INVENTORS
George E. Gonsalves
Felice Dosso
BY Philip S. Hillert
ATTORNEY

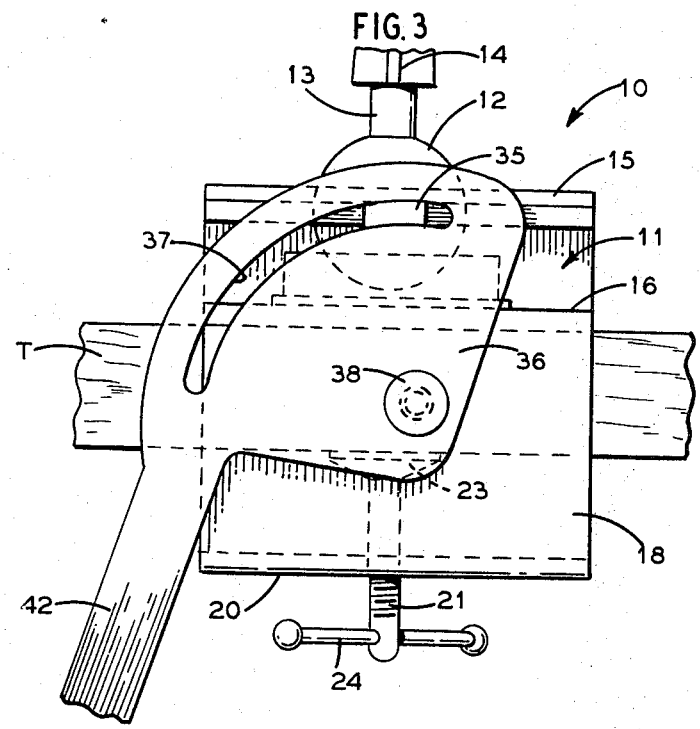
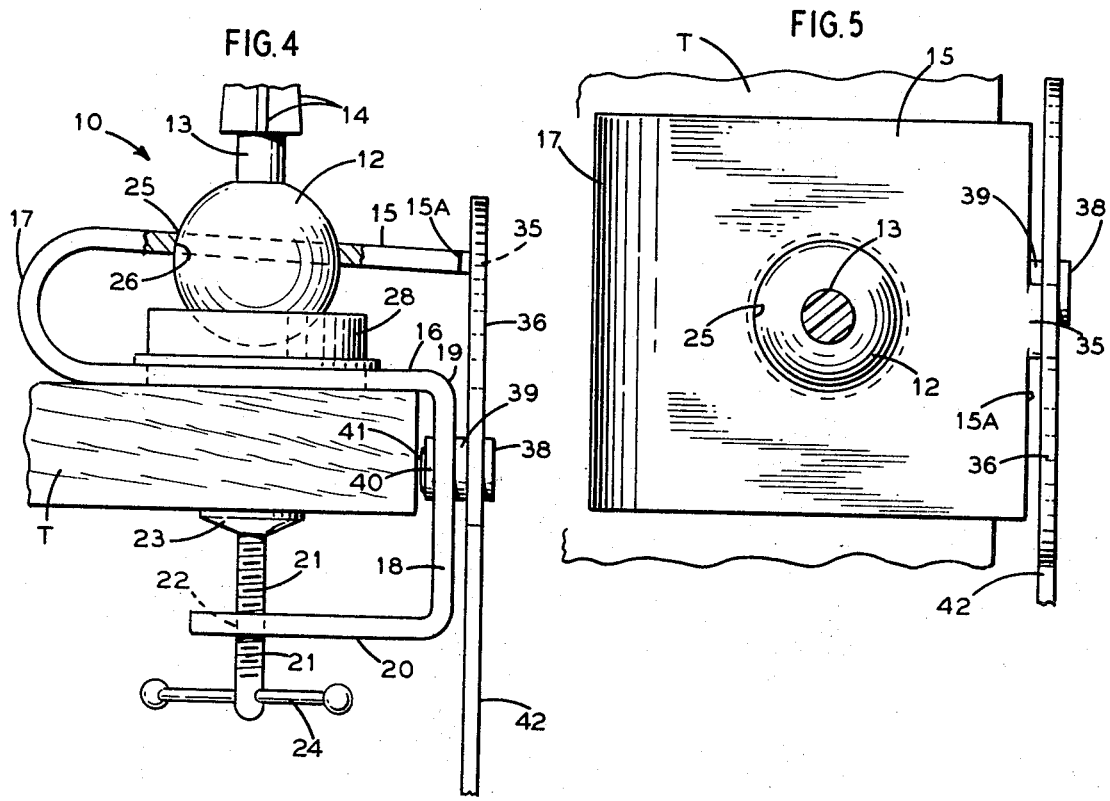

LOCKING MEANS FOR BALL AND SOCKET JOINT

BACKGROUND OF THE DISCLOSURE

Ball and socket joints are commonly used in conjunction with work support means to allow the work support means to be quickly moved to desired positions so as to present the work piece on the support in a selected position or positions. Since it is frequently desirable to lock the work support means against inadvertent movement from its selected position, various locking means have been proposed including set screws and the like.

However, known locking means for ball and socket joints suffer from a number of disadvantages including insufficient gripping action under manual operation; complexity of the locking means; undue bulk of the locking means; and relatively high costs for such auxiliary devices.

Accordingly, an object of this invention is to provide improved locking means for a ball and socket joint, which is of simple, inexpensive construction, is capable of providing high gripping forces with simple manual operation, and is quick acting in shifting between grip and release positions.

Another object of this invention is to provide a locking means for a ball and socket joint which includes a cam arrangement for varying the gripping relation of the socket portions relative to the ball portion of the joint; the cam being movable through a relatively small angular path to pass between release and tightly gripping positions thereof.

Yet another object of this invention is to provide a combination ball and socket joint and locking means, which is formed from bent metal plate to facilitate production and reduce costs; which is of a construction that allows for speedy assembly of the parts thereof; and which is operable manually with a minimum amount of physical effort.

Other objects of this invention will in part be obvious and in part hereinafter pointed out.

DESCRIPTION OF THE DRAWING

FIG. 3 is a view similar to that of FIG. 2, showing the device in a locking position;

FIG. 4 is a side elevational view thereof; and

FIG. 5 is a top plan view thereof.

DESCRIPTION OF THE PREFERRED EMBODIMENT

Figure 1:
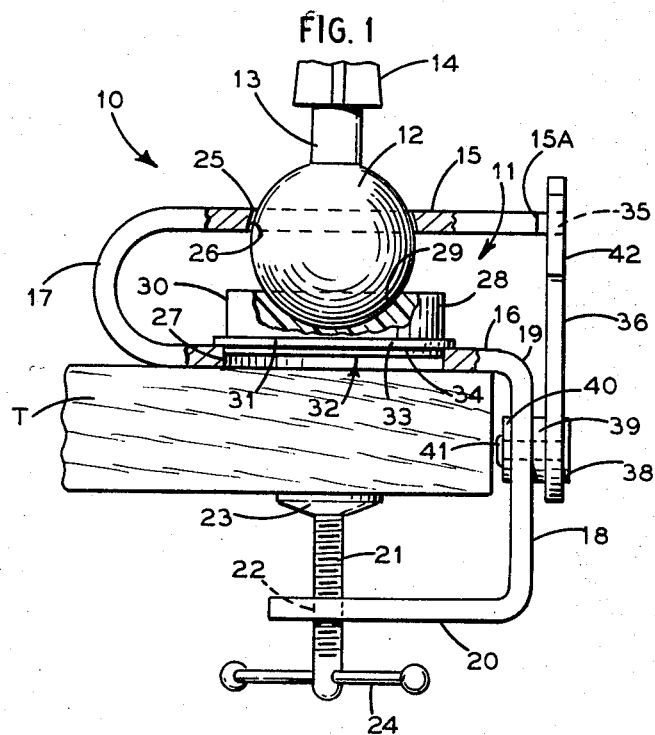
FIG. 1 is a side elevational view, with parts in section, showing locking means for a ball and socket joint embodying the invention.

As shown in the drawing, 10 designates a ball and socket construction including locking means, embodying the invention. The same comprises essentially, a metal stamping generally indicated at 11, which constitutes the socket portion of the device; and a ball member generally indicated at 12, which is adapted to be universally mounted in the socket portion 11. The ball member 12, includes the usual stem 13 projecting therefrom with wedging, tapered ribs 14 on the stem 13 at 90° intervals. A workpiece supporting block, not shown, is adapted to be mounted on stem 13, the block having the usual tapered cavity to receive wedging ribs 14, all in a manner known in the art.

The metal stamping 11 comprises a pair of substantially parallel plate portions 15, 16 which are resiliently interconnected by an integral, U-shaped bight portion 17. The plate portions 15, 16 are of a selected thickness sufficient to maintain their spacing yet allowing some movement toward and away from each other by way of bight portion 17.

The device 10 is adapted to be demountably affixed to a support surface such as a table top T or the like. To this end, an apron portion 18 depends from the forward edge 19 of lower plate portion 16 and terminates in a horizontal bracket portion 20 which is in opposed relation to plate portion 16. The resultant C clamp structure, is provided with a clamping screw 21 passing through a threaded opening 22 in bracket portion 20. The screw 21 is provided with the usual cupped washer 23 at the upper end thereof for engaging the lower surface of support T; a handle 24 extending angularly from the lower end of said screw 21 to turn the same to clamping and release positions.

The upper plate portion 15 is formed with a circular opening 25 of a diameter somewhat less than that of ball member 12; the annular edge of said opening being transversely curved to form an upper seat 26 for ball member 12. The lower plate portion 16 is formed with a circular opening 27 which is coaxially related to opening 25, and which is of a diameter somewhat larger than that of ball member 12. This permits the ball member 12 to be passed through opening 27 for location between plate portions 15, 16 in the assembly of the device 10.

The lower seat for ball member 12 takes the form of a cup shaped plastic block 28 having a part spherical recess 29, an annular side wall 30 and a flat bottom surface 31. The plastic block 28 may be molded from suitable wear resistant resins such as nylon, or the like.

The block 28 is supported on a metal disc 32 formed with an annular flange 33 to provide an annular shoulder 34. The disc 32 is located within opening 27 of lower plate portion 16. The bottom surface 31 of block 28 is in contact with the upper surface of disc 32. It is understood that disc 32 has a thickness slightly greater than the normal space between the bottom of block 28 and the upper surface of lower plate portion 16.

Accordingly, after the ball member 12 and block 28 have been located between plate portions 15, 16; the said plate portions are slightly displaced from each other, to allow disc 32 to be moved laterally over the top surface of lower plate portion 16 to snap the same into opening 27. With plate portions 15, 16 released and with their normal spacing; the assembly of ball member 12, block 28 and disc 32 will be retained in place. Thus, the ball member 12, with its stem 13 projecting upwardly through opening 25 in upper plate portion 15, is free to be swivelled to any desired position.

However, in order to restrain ball member 12 from further movement after it has been brought to a desired angular position, locking means is provided. To this end, cam means is used to positively move plate portions 15, 16 toward each other so as to exert a tight gripping action on ball member 12. Accordingly, the free edge 15A of upper plate portion 15 has a short rib portion 35 projecting from a central portion thereof, said rib portion 35 having a curvature longitudinally thereof.

On the outer surface of apron portion 18 of lower plate portion 16, there is movably mounted a triangular slotted cam plate 36, with a curved slot 37 therein for receiving rib portion 35 therein. The cam plate 36 is mounted on apron portion 18 by means of a headed rivet 38, an intermediary washer 39 disposed between the inner surface of cam plate 36 and the outer surface of apron portion 18, and an end washer 40 abutting the inner surface of apron portion 18. The rivet 38 is upset at its outer end, as at 41, to frictionally hold cam plate 36 for pivoted movement thereof, by way of handle means 42 projecting from an edge portion of said cam plate.

Figure 2:
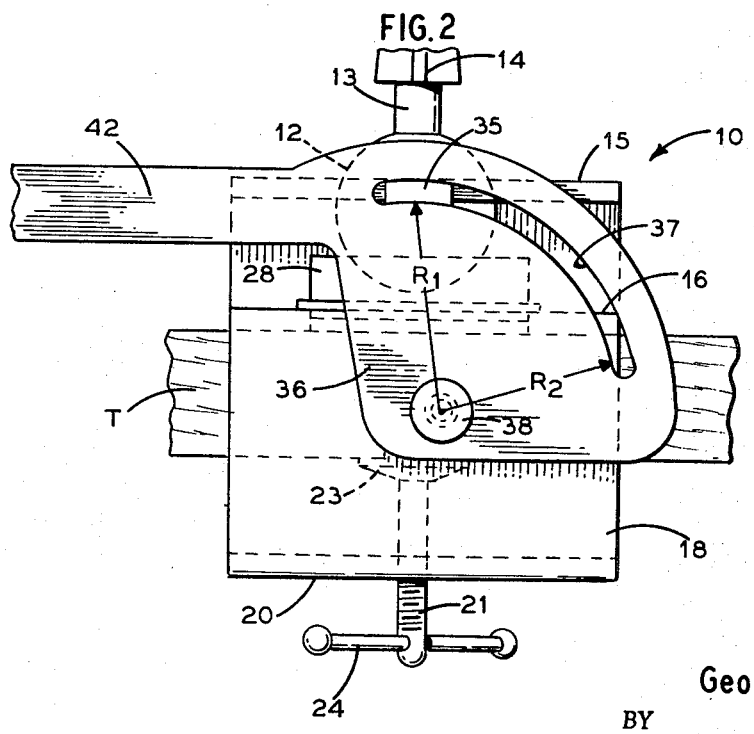
FIG. 2 is a front elevational view showing the locking means in its release position.

The slot 37 in cam plate 36 has a curvature of progressively changing radii, as at $R_1$, $R_2$, etc. Thus, such device 10 may have its cam plate 36 positioned by handle means 42 in a position wherein the ball member 12 may be moved as desired to selected positions. In this case, as shown in FIG. 2, the cam plate 36 has been turned so that rib 35 is disposed in the extreme left hand position in slot 37. Accordingly, the radius $R_1$ is at a maximum.

Upon moving handle means 42 to pivot cam plate 36 in a counterclockwise direction, the decreasing radius $R_2$ causes plate portions 15, 16 to tightly grip ball member 12, see FIGS. 3, 4. Obviously, the degree of grip may be varied by the relative angular position of handle means 42. Also, the camming action as shown lends itself to quick action between desired degrees of release and grip in respect to ball member 12.

The device 10 may be used for mounting a variety of work supports which in turn may have mounted thereon diverse work pieces, such as wigs and the like. In each case, the operator is in a position to quickly position the the stem 13 which carries the work support and work piece, as desired, lock the same to allow for necessary manipulative action in respect to the workpiece, not shown; and to permit quick release of the same to allow movement of stem 13 to other selected positions.

We claim:

1. A ball and socket construction comprising socket means and ball means mounted in said socket means for movement to selected angular positions thereof, said socket means comprising a bent metal member including a pair of substantially parallel plate portions and a portion for resiliently connecting said plate portions along one edge thereof, said plate portions being formed with coaxially related openings, one of said openings having a diameter less then that of said ball means to provide upper seat means for said ball means, the other of said openings having a diameter greater then that of said ball means for passing said ball means therethrough into a position between said plate portions, lower seat means between said plate portions for engaging said ball means, means mounted in the opening in said second mentioned plate portion for supporting said lower seat means, and means for moving the plate portions along the edge thereof opposite to said one edge thereof towards each other to exert a gripping and locking action with respect to said ball means, said plate portion moving means comprising curved cam follower means projecting from one of said plate portions and a slotted cam plate rotatably mounted on the other of said plate portions, the slot in said cam plate being spirally curved relative to the axis of rotation thereof for receiving said cam follower means, and means for moving said cam plate in a direction to progressively increase the clamping action of said plate portions relative to said ball means.

2. A ball and socket construction as in claim 1 and further including means extending from said second mentioned plate portion for clamping said ball and socket construction to supporting means.

3. A ball and socket construction as in claim 1 wherein, said lower seat means comprises a member formed with a part spherical recess and a flat bottom surface, said lower seat supporting means comprising a disc having an annular shoulder for locating said disc in the opening in said second mentioned plate portion and disposing the upper surface thereof in supporting contact with the flat bottom surface of said lower seat means.

4. A ball and socket construction as in claim 1 wherein said plate portions are rectangular and the portion connecting said plate portions being of U-shaped cross section; the second mentioned plate portion having an apron portion depending from the second mentioned edge thereof, said cam plate being substantially triangular in shape, means for movably mounting an apex portion of said cam plate on said apron portion, the slot in said cam plate having a curvature with progressively changing radii measured to the cam plate mounting means.